United States Patent [19]

Masaki

[11] Patent Number: 5,191,647
[45] Date of Patent: Mar. 2, 1993

[54] IMAGE DATA PROCESSING SYSTEM

[75] Inventor: Yasuo Masaki, Nara, Japan

[73] Assignee: Minolta Camera Kabushiki Kaisha, Osaka, Japan

[21] Appl. No.: 652,318

[22] Filed: Feb. 7, 1991

Related U.S. Application Data

[63] Continuation of Ser. No. 497,827, Mar. 22, 1990, abandoned, which is a continuation of Ser. No. 364,555, Jun. 8, 1989, abandoned, which is a continuation of Ser. No. 901,125, Aug. 28, 1986, abandoned.

[30] Foreign Application Priority Data

Aug. 30, 1985 [JP] Japan .............................. 60-192443
Sep. 2, 1985 [JP] Japan .............................. 60-194090

[51] Int. Cl.⁵ .............................................. G06F 15/62
[52] U.S. Cl. ................................ 395/164; 395/162; 364/DIG. 1; 364/240.2; 364/DIG. 2; 364/935.46
[58] Field of Search ... 364/518, 521, 522, 200 MS File, 364/900 MS File; 340/723, 798, 799; 395/162, 163, 164, 165, 166

[56] References Cited

U.S. PATENT DOCUMENTS

| 4,266,270 | 5/1981 | Daniels et al. | 364/200 |
|---|---|---|---|
| 4,342,029 | 7/1982 | Hofmanis et al. | 340/703 |
| 4,342,095 | 7/1982 | Goodman | 364/900 |
| 4,462,028 | 7/1984 | Ryan et al. | 340/799 |
| 4,462,073 | 7/1984 | Grondalski | 364/200 |
| 4,591,902 | 5/1986 | Masubuchi | 358/59 |
| 4,636,858 | 1/1987 | Hague et al. | 358/147 |
| 4,706,205 | 11/1987 | Akai et al. | 364/518 |
| 4,760,525 | 7/1988 | Webb | 364/200 |
| 4,777,615 | 10/1988 | Potash | 364/900 |

Primary Examiner—Heather R. Herndon
Assistant Examiner—Phu K. Nguyen
Attorney, Agent, or Firm—Burns, Doane, Swecker & Mathis

[57] ABSTRACT

An image data processing system comprising an image data input circuit, an image memory, an arithmetic logical circuit, an image data output circuit and a plurality of data buses, wherein the data buses include a first data bus to which the image data input circuit and the arithmetic logical circuit output data and from which the image memory and the image data output circuit input data and a second data bus to which the image data input circuit and the image memory output data and from which the arithmetic logical circuit and the image data output circuit input data. This image data processing system permits new direct data flows from the input circuit to the arithmetic logical circuit, from the input circuit to the output circuit and from the arithmetic logical circuit to the output circuit, in addition to conventional data flows from the input circuit or the arithmetic logical circuit to the image memory and from the image memory to the arithmetic logical circuit or to the output circuit.

29 Claims, 7 Drawing Sheets

IMAGE DATA PROCESSING SYSTEM

This application is a continuation of application Ser. No. 07/497,827, filed Mar. 22, 1990, which is a continuation of application Ser. No. 07/364,555, filed Jun. 8, 1989, which is a continuation of application Ser. No. 06/901,125, filed Aug. 28, 1986, all now abandoned.

FIELD OF THE INVENTION

The present invention relates to an image data processing system comprising an image memory, an arithmetic logical circuit, an input circuit and an output circuit.

DESCRIPTION OF THE PRIOR ART

For depicting and indicating various kinds of information, original information signals are processed in various manners to be converted into object image signals and then displayed by means of a CRT or formed into a "hard" copy by means of a printer. In this case, the original information signals are digitized to be arithmetically and logically processed by means of a computer. To describe one of the simplest manners to achieve the above object, the image data to be arithmetically and logically processed are stored in a memory integrated in a general purpose computer. According to a program stored in the same memory, the computer reads out one pixel of the image data to execute a predetermined arithmetic logical processing thereon and restores the processed image data in the memory. This process is repeatedly carried out for all the pixels constituting a screen. This method serves sufficiently well when the speediness of the processing operation is not important, for instance at an early stage of the data processing operation for deciding what kind of data should be derived and indicated in what manner, because an operator is capable of monitoring the data through a small screen with a trial processing program. However, the above method is not suitable for a practical data processing which requires very rapid operation. For the speediness of the operation, it is desirable not to serially process the image data according to the program but to process the data through a circuit capable of a continuous arithmetic and logical processing. For this purpose, there are generally two possible methods. According to the first method, a direct memory access (DMA) circuit is provided to permit a main memory of a central processing unit (CPU) to reserve a space available for a memory for the image data such that the image data may be continuously read out not by means of the program, and further an arithmetic logical circuit is provided for processing the continuously input image data. According to the second method, an image data memory is provided independently of a main memory space of the CPU and the arithmetic logical circuit is provided for processing the continuously input image data, further the image data memory and the arithmetic logical circuit being connected with each other through an image data bus provided exclusively for this purpose, whereby processing rapidity is obtained. Comparing the above two methods, as for the first method, since a part of the main memory is employed as the image data memory, it is impossible for a cycle time of the data to be shorter than the shortest cycle time in a random access operation when the main memory which is originally provided for the random access continuously reads out the image data. Whereas, as for the second method, since the memory is provided exclusively for storing the image data, it is possible to shorten the cycle time of the data in the continuous data reading-out operation. Therefore, the second method has a greater possibility for shortening the processing speed.

FIG. 9 generally illustrates this second method, in which only the relationship among the main circuits and the bus lines provided exclusively for the image data transfer is shown, while the CPU acting as a control circuit, circuits providing addresses to the image memory and the like are not shown. Referring to the same figure, the image data are converted to be applicable for the system through an input circuit 100, then output to a first data bus X to be written into the image memory 200. More particularly, the image data, which are analog video signals sent from a T.V. camera for instance, are input to the input circuit 100 in a predetermined sampling cycle to be converted therein into a predetermined type of digital data comprising a certain number of bits and then the digitalized image data are output continuously, in accordance with a sampling clock or another clock which controls the function, on the first data bus X. With a completion of one-screen image scanning of the TV camera, the image data containing the one screen of information are stored in the image memory 200. This image memory 200 includes one plane of memory for storing the one screen of the image data. If the number of the planes is increased, the memory becomes capable of storing image data containing information of a correspondingly increased number of screens, or unused planes may be advantageouly utilized for storing the image data after and in the course of processing. The image data are then continuously output from the image memory 200 to a second data bus Y to be input to the arithmetic logical circuit 300, an output circuit 400 or both. Normally, the image data accessed through the data bus Y is transferred in accordance with the same clock as for the data bus X. The arithmetic logical circuit 300, after inputting the image data from the data bus Y, processes the data in the cycle determined by the data transfer clock for the data bus and then outputs the results again on the first data bus X. The resulting arithmetically and logically processed data are written into the image memory 200 in the same manner as the image data input from the input circuit 100.

The output circuit 400, after inputting the image data from the second data bus Y in the same manner as the arithmetic logical circuit 300, outputs the data to a peripheral device after converting the data to be applicable thereto. In the case where the peripheral device is a CRT display, the image data are converted into analog data and output as analog video signals including synchronizing signals.

The above flow of the image data in the image data processing system illustrated in FIG. 9 will be summarized in the following three cases.

(1) image data input: input circuit to image memory
(2) image data arithmetic and logical processing: image memory to arithmetic logical circuit to image memory
(3) image data output: image memory to output circuit The above three cases will remain basically the same if an image data processing system having a different architecture from the one shown in FIG. 9 is employed, although some minor modifications may be made such that a data bus independent of the one provided between the arithmetic logical circuit and the image memory is provided for connecting the input circuit and the image memory or that two data buses are independently provided for connecting between the image memory and the arithmetic logical circuit and between the image memory and the output circuit. The architecture of the image data processing system as represented by the one shown in FIG. 9 has made some improvement in comparison with the previously described case in which the general purpose computer is employed; however, the system does not yet make the most of the advantage of the image memory, the arithmetic logical circuit and the data buses all of which are adapted for speedy data processing operation. That is to say, in the above system, all of the three paths of the image data flow start or end at the image memory, thus, there occurs a problem that it is impossible, for instance, to indicate or confirm the data from the input circuit without writing the data once into the image memory. This means that the image memory must reserve a space available for one screen of image data. When the image memory has only small memory capacity, this considerably deteriorates utilization efficiency of the image memory. Similarly, when the arithmetic logical circuit inputs the image data from the image memory, processes the data synchronously with the image data transfer clock and then continuously outputs the processed data, it is impossible to indicate or confirm the data without once writing the output data into the image memory. That is to say, the data must be written into the image memory whether the arithmetic and logical processing is needed or not. Therefore, in this case also, the utilization efficiency of the image memory is deteriorated. Further, in the same manner as the above data output indication operations, the input data must be processed in the arithmetic logical circuit only after being once written into the image memory, thus in the case of comparing the camera input image data with the data stored in the image memory for example, the processing speed is reduced in half. This may be regarded as an extremely inefficient use of the system considering that the arithmetic logical circuit originally has capacity to process the data at the same speed as the input circuit outputs the image data. As described above, the conventional system as represented by the one shown in FIG. 9, despite the speedy characteristics of each circuit, has yet to be improved with respect to the speediness of the processing with its structural defects.

In the foregoing image data processing system, the original image data are monochromatic, i.e. represent a two-dimensional distribution of a quantity of a single scalar, whereby the processed image is also monochromatic. Hereinafter will be described a image data processing for a colored image. A conventional image data processing system is often utilized for indicating the two-dimensional distribution of the quantity of the single scalar, e.g. indicating a two-dimensional temperature distribution, in which the scalar quantity is divided into a certain number of ranks to each of which a different color is assigned. This system having a plurality of data output channels but only one data input channel is useful enough for the above-described purpose. However, for processing a colored image, this system need process the data serially one color after next since it is impossible for the system to process the three primary color elements of the image data simultaneously.

FIG. 10 shows a known color image data processing system describing mainly its image data flow. In the same manner as the foregoing system shown in FIG. 9, a reference numeral 100 denotes an input circuit for converting image data from a peripheral device to be applicable to the system and then outputting the data. Assuming that the image data from the peripheral device comprise analog video signals obtained from a TV camera, the input circuit 100 inputs the analog video signals in a predetermined cycle, converts the signals into a predetermined type of digitalized data comprising a certain number of bits and then continuously outputs the digitalized image data on a first data bus X in accordance with the sampling clock or another clock for controlling the basic function. A reference numeral 200 denotes an image memory for inputting and storing the image data continuously provided through the first data bus X. This image memory normally includes a plurality of memory planes, e.g. for red, green and blue, each of which is independently set to its input, output or waiting state. The image memory 200 further includes three output ports connected to a data channel Y having three data buses. When one of the planes of the image memory 200 outputs to one of the data buses of the data channel Y, connections between the other planes and this data bus are inhibited. Since the data channel includes the three data buses, every one of the three planes is capable of outputting to the data channel Y. If the three planes respectively store each of three elements of the three primary colors of a screen of colored image, the output circuit 400 is capable of outputting color image data to the peripheral. At this time, an output circuit 400 converts the image data from the data channel Y to be applicable to the peripheral for the output. Assuming that the peripheral comprises a color CRT display of a RGB input type, the output circuit 400 converts the three image data from the data channel Y into analog data through its three AD convertors and outputs to the color CRT display the data with compound synchronous signals or with a synchronous signal added to each of color signals.

An arithmetic logical circuit 300 inputs the image data from the data channel Y, continuously processes the data in the cycle synchronously with the data cycle of the channel and then outputs the processed data to the data bus X to be transferred and written into the image memory 200. The arithmetic logical circuit 300 includes three input ports. Not all of the three ports are always used. By using one of the ports, the circuit 300, utilizing its multi-arithmetic and logical processing facility, binarizes the data by comparing one screen of monochrome image data with constants or carries out a gradation adjustment through a non-linear conversion, for instance. By using two of the input ports, the circuit 300, utilizing one of the spare processing facilities, is capable of computing an average or a difference between two screens of monochrome images. By using all of the three input ports, the circuit linearly couples three screens of monochrome images through processing the three input image data or carries out the linear coupling processing for the three primary colors of a colored image and obtains an element through a color coordinate conversion.

As previously described with reference to FIG. 10, in whatever function the above-described system may be engaged in, what matters most is that the image data need go through the image memory and the object image data, except the few, are monochromatic since these two facts pose the following problem with the conventional system. According to the conventional system, the arithmetically and logically processed data are output on the single data bus X and then once held in the image memory to be output therefrom, thus the image memory inputs only the monochromatic image information at one time. This means that for processing the three primary colors of the colored image the image memory need repeat the processing three times. More specifically, for obtaining an average colored image through an averaging operation on two screens of colored images, the averaging operation for two screens of monochromatic images must be repeated for each of the three primary color elements of the colored image. Therefore, according to the conventional system, the colored image data processing takes a long time and the image memory is not used efficiently.

SUMMARY OF THE INVENTION

The object of the present invention is to solve the problems of the above-described conventional image data processing system and to achieve speediness in various types of image data processing operations by improving the accessibility through data buses between or among the image data input circuit, the image memory, the arithmetic logical circuit and the image data output circuit and through an efficient data bus construction accompanying thereto.

In order to achieve the above object, the image data processing system according to the present invention comprises an image input circuit, an image memory, arithmetic logical circuit means, an image output circuit, and data bus means including a plurality of data buses, wherein the image input circuit, the image memory and the arithmetic logical circuit means respectively output data on the data bus means to be transferred therethrough and the image memory, the arithmetic logical circuit and the image output circuit respectively input data from the data bus means.

This construction permits the data bus provided with the data output from the image memory to be connected to the respective input ports of the arithmetic circuit and the output circuit, whereby the output data of the input circuit may be directly input to the arithmetic circuit, the output circuit, or both, and consequently the following data flows are enabled.

A: input circuit to image memory
B: input circuit to image memory to arithmetic logical circuit
C: arithmetic logical circuit to image memory to output circuit
D: input circuit to image memory to output circuit
E: input circuit to arithmetic logical circuit
F: input circuit to output circuit
G: arithmetic logical circuit to output circuit The above data flows A through D are permitted by the conventional system, however, the flows E through G become possible only by the new system according to the present invention. For instance, the data flow B of the conventional system may be replaced by the flow E, whereby the data need not be written into nor read out from the image memory and a speedy processing is obtained.

Further, in order to achieve the oject of the present invention with image information including a plurality of elements, e.g. color image information having the three RGB elements, this image data processing system comprises an image input, circuit for simultaneously inputting n-components of image information, an image momory including at least n-memory planes, arithmetic logical circuit means for simultaneously processing the n-elements of image information, an image output circuit capable of simultaneously outputting the n-components of image information, and data channel means including a plurality of data channels, wherein each of the data channels has n-data buses, the image input circuit, the image memory and the arithmetic logical circuit means respectively output the n-component of image information on the data channel means from which the image memory, the arithmetic logical circuit means and the image output circuit respectively input the n-components of image information.

This construction permits the image memory to input and thereby to process the n-components of the image information simultaneously and since the information may be directly output from the input circuit and the arithmetic logical circuit to the output circuit, the image data flow need not go through the image memory.

Effects of the invention will be described next. The data bus construction as described above has enabled new data flows. For instance, for the image information input, it has become possible to input the input data once into the arithmetic logical circuit to be processed therein and then to input the processed data into the image memory as well as the direct data input from the input circuit to the image memory. Thus, since the data need not be again arithmetically and logically processed after being input into the image memory, the processing speediness and the utilization efficiency of the image memory have been significantly improved compared to the conventional system. Further, since the arithmetic logical circuit is capable of inputting other data such as the data output from the image memory or another input circuit, it has become also possible to carry out an arithmetic and logical processing for two screens of information simultaneously in the image data input. For the data image processing, with the conventional system, the output data from the image memory are processed and then again written into the image memory. In contrast, with this new system, in addition to the output data from the planes of the image memory, two kinds of data from two sets of input circuits and data from the input circuit and the image memory may be selectively provided, thus the arithmetic logical circuit means may selectively output the data not only to the image memory but also to the output circuit, whereby a greater variety of data may be processed. Also, since it has become possible to directly indicate the arithmetically and logically processed data without storing it in the image memory, the utilization efficiency of the image memory has been improved. Still further, for image data output, in contrast with the conventional system which only causes the image memory to output the data to the output circuit, the present system, in addition to this flow, permits direct data transfers from the arithmetic logical circuit to the output circuit and from the input circuit to the output circuit, selectively. It may seem unnecessary for the image data processing system to be capable of directly outputting the input data, however, this facility is strongly needed when determining a timing of sampling image data from a moving image while monitoring the image data. Also, the present system enables another data flow, input circuit to arithmetic logical means to output circuit, which permits a speedy data processing without using the image memory at all.

The above-mentioned effects may be similarly obtained with the system according to the present invention for processing the image information including the plurality of elements such as a colored image.

DESCRIPTION OF THE PREFERRED EMBODIMENTS

Figure 1:
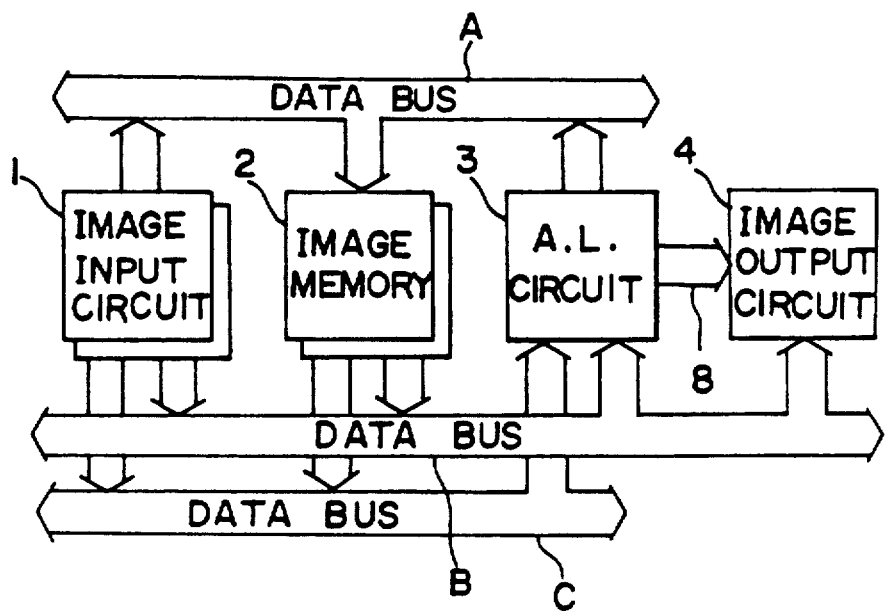
FIG. 1 is a block diagram of an image data processing system according to the present invention.

FIG. 1 illustrates an embodiment of the present invention. A reference numeral 1 denotes an image data input circuit for converting data from a peripheral e.g. image signals from a TV camera, via A/D conversion, into data signals applicable to the system. A numeral 2 denotes an image memory including one or preferably a plurality of planes as representing a memory space for storing an element of data. In this embodiment, the memory includes two planes. A numeral 3 denotes an arithmetic logical circuit for executing image processing based on a given program. A numeral 4 is an output circuit for converting image data signals operated on by this system into a form applicable to peripherals, e.g. a CRT, or a printer.

A first data bus A connected to output ports of the input circuit 1 and of the arithmetic logical circuit 3, serves as data input lines for the image memory 2 as inputting data from the input circuit 1 or from the arithmetic logical circuit 3 to the image memory 2. A second data bus B serves as data output lines from the image memory 2 and is connected to respective input ports of the arithmetic logical circuit 3 and of the output circuit 4 and is further connected to the output port of the input circuit 1. Thus, this second data bus B is capable of transferring data from the input circuit 1 directly to the arithmetic logical circuit 3 or directly to the output circuit 4. A third data bus C has the same functioning as the second bus B. The second and third date buses B and C are designed not exclusively for the two planes of the image memory 2 respectively but are interchangeably employed for either of the planes. That is to say, the image memory 2 has a plurality of buses for outputting data. This architecture, for example, permits the second data bus B to transfer data held in the image memory 2 to the arithmetic logical circuit 3 for arithmetic and logical processing and simultaneously permits the third data bus C to transfer data output from the input circuit 1 to the output circuit 4 for indication.

A reference numeral 8 denotes a data line designed exclusively for outputting data from the arithmetic logical circuit 3 to the output circuit 4. This data line, in contrast to a conventional architecture where arithmetically and logically processed image data are stored in the image memory and then output to the output circuit, permits a direct data transfer from the arithmetic logical circuit 3 to the output circuit 4. The conventional architecture requires two planes when it need not only carry out arithmetic and logical processing but also retain original image data. Whereas, this architecture according to the present invention as capable of the direct data output from the arithmetic logical circuit 3 to the output circuit 4, requires only one plane and moreover, if provided with a plurality of them, the extra plane may be used for other purposes. It is to be noted that these data transfers are controlled by a computer not shown, in the same manner as in a conventional system.

The data flows discussed in the aforementioned embodiment will be summarized as follows, in which the reference characters and numerals respectively denote the employed data bus.

(1) image data input
    input circuit→A→image memory
    input circuit→B and/or C→arithmetic logical circuit→A→image memory
    image memory→B and/or C→arithmetic logical circuit→A→image memory
    input circuit→B and/or C→arithmetic logical circuit→A→image memory (2) image data processing and the like image memory→B and/or C→arithmetic logical circuit →A→image memory
    image memory→B and/or C→arithmetic logical circuit →8→output circuit
    input circuit→B and/or C→arithmetic logical circuit →A→image memory
    input circuit→B and/or C→arithmetic logical circuit →8→output circuit (3) image data output
    image memory→B and/or C→arithmetic logical circuit →8→output circuit
    input circuit→B and/or C→arithmetic logical circuit→8→output circuit
    image memory→B→output circuit
    input circuit→B→output circuit as described above, various types of data flows are obtainable.

Figure 2:
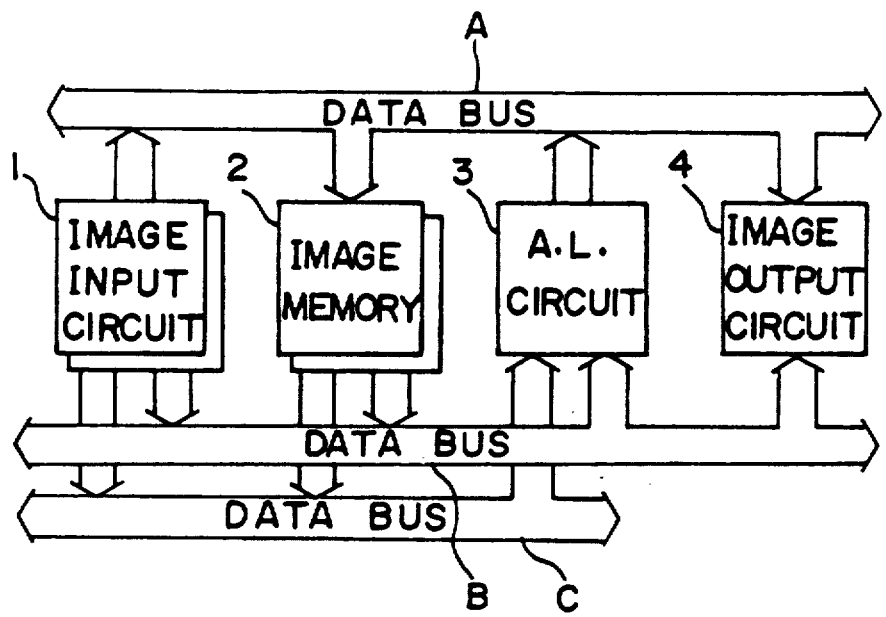
FIG. 2 is a block diagram of a modification of the image data processing system shown in FIG. 1.

FIG. 2 illustrates another embodiment, which is different from the previous one in that the data line 8 designed exclusively for the data transfer from the arithmetic logical circuit 3 to the output circuit 4 is eliminated whereas the first data bus A is modified to serve in place thereof as connected to a newly provided input port of the output circuit 4. The overall functioning of this architecture is the same as that of the previous embodiment shown in FIG. 1.

This architecture, however, has both an advantage over and a disadvantage against the previous one: the former shown in FIG. 2 requires only one output port for the arithmetic logical circuit 3 whereas the latter shown in FIG. 1 requires two but the latter permits, simultaneously with the data transfer from the arithmetic logical circuit 3 to the output circuit 4, the extra data bus A unused for said operation to serve for writing data into the image memory whereas the former does not.

Figure 3:
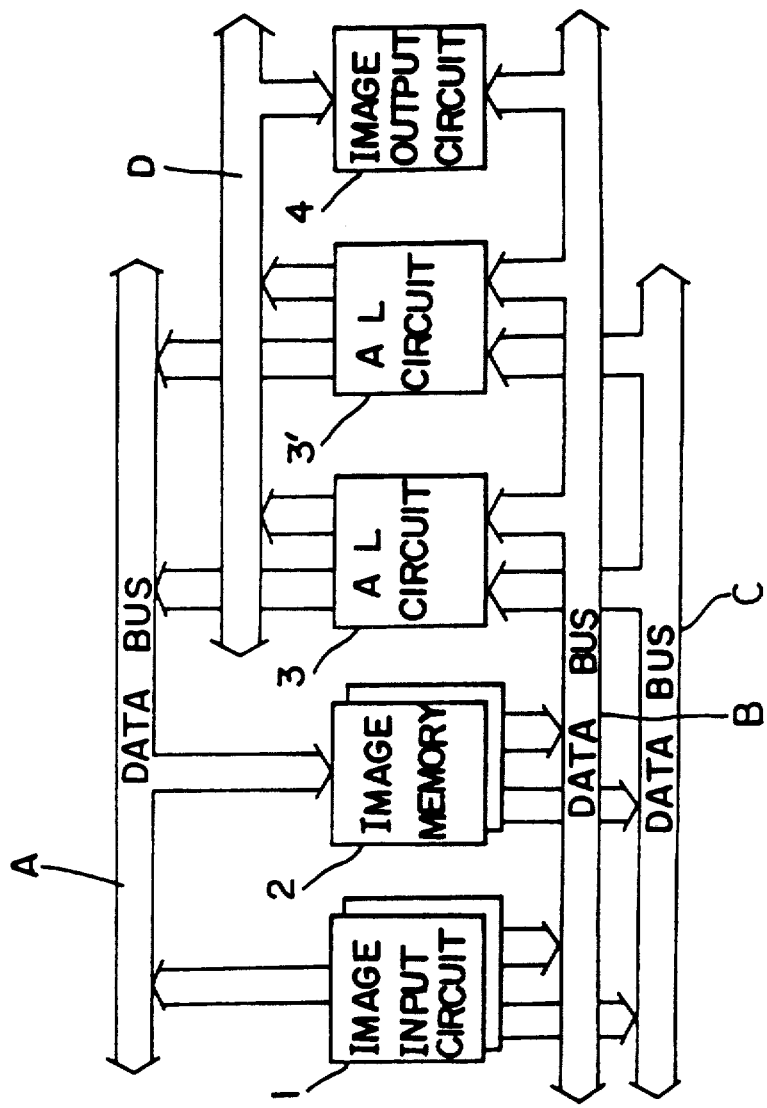
FIG. 3 is a block diagram of another modification of the image data processing system shown in FIG. 1.

FIG. 3 shows a modification of the embodiment shown in FIG. 1, which difference will be described hereinafter. This modified system comprises a plurality of the arithmetic logical circuits (in this case two of them 3, 3' are provided) and at the same time the data line 8 designed exclusively for the data transfer from the arithmetic logical circuit to the output circuit is replaced by an exclusive data bus D which is connected to one of output ports of each of the arithmetic logical circuits 3, 3' and to one of the input ports of the output circuit 4. This exclusive data bus D transfers processed data output from each of the arithmetic logical circuits directly to the output circuit 4. The remaining elements are the same as the embodiment shown in FIG. 1, as the two input ports of the arithmetic logical circuit 3 are connected to the second and third data buses B, C and the other output port of the arithmetic logical circuit 3 is connected to the first data bus A. Therefore, the data flows in this system are substantially the same as those of the previously described embodiment except that the two arithmetic logical circuits permit a simultanous data processing. More specifically, according to this modified system, one of the arithmetic logical circuits 3, for example, processes data from one of the planes of the image memory 2 and outputs the result again to the image memory 2 and at the same time the other arithemtic logical circuit 3' processes data from the other plane and outputs the result to the output circuit 4.

Figure 4:
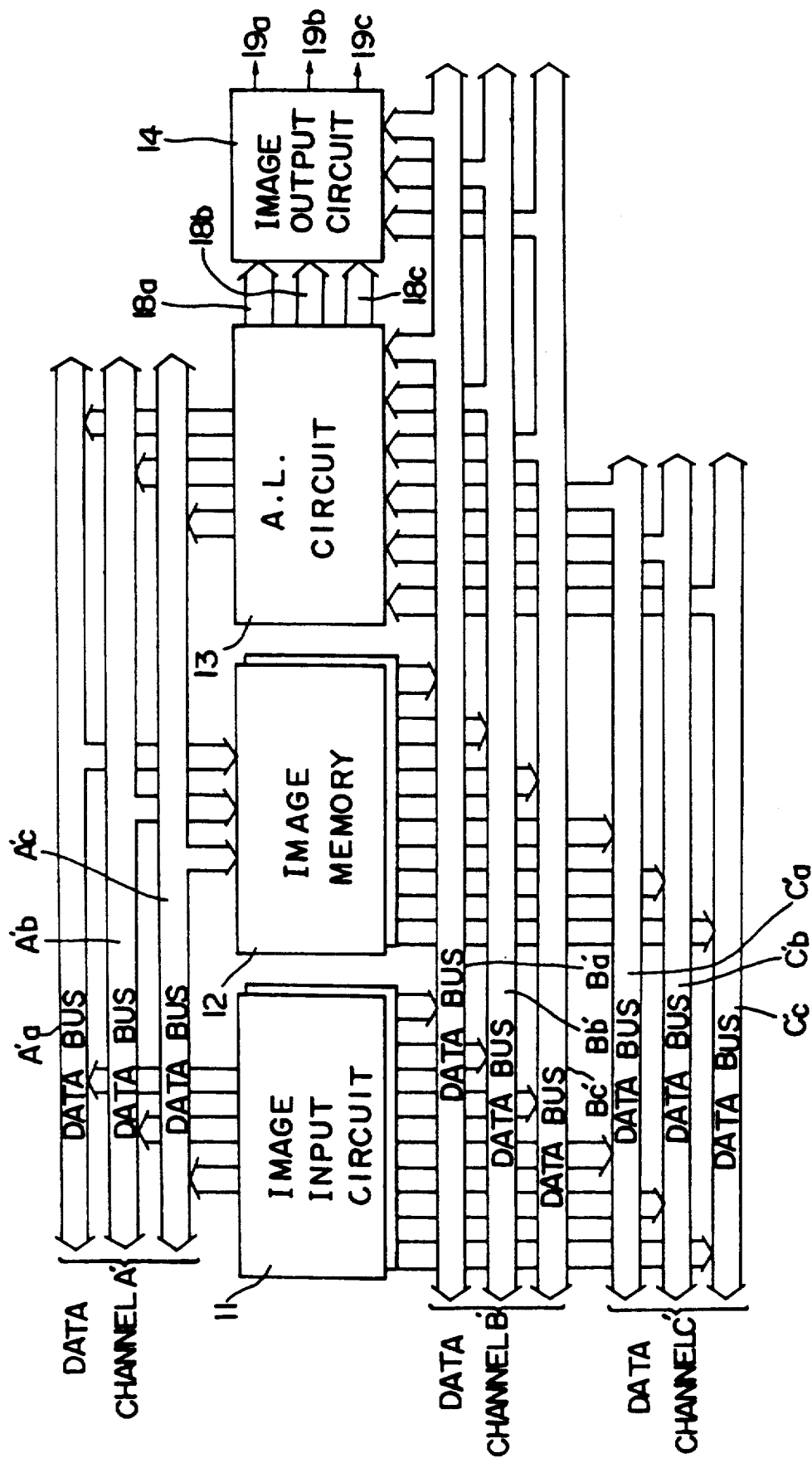
FIG. 4 is a block diagram of another embodiment of the image data processing system according to the present invention.

FIG. 4 shows another embodiment of the image data processing system according to the present invention for processing image information including a plurality of elements. A reference character A' denotes a first data channel comprising three data buses Aa, Ab, Ac respectively connected to input ports of an image memory 12. This image memory 12 has three memory planes in this embodiment. However, the number of the planes may be increased for better image processing efficiency. The connections between the plurality of data buses and the memory planes are interchangeable by means of a computer not shown. The first data channel A' connects an image data input circuit 11 and an arithmetic logical circuit 13 and transfers arithmetically and logically processed data again to the image memory 12 to be held therein. Second and third data channels B', C' comprising data buses B'a, B'b, B'c and C'a, C'b, C'c respectively will be described next. The data buses B'a, B'b, B'c constituting the data channel B' connect output ports of the image memory 12 and of the input circuit 11 and input ports of the arithmetic logical circuit 13 and of an output circuit 14. The data buses C'a, C'b, C'c constituting the data channel C'respectively connect other three output ports of the image memory 12 and of the input circuit 11 and other three input ports of the arithmetic logical circuit 13. Further, an exclusive data channel comprising three data lines 18a, 18b, 18c connects the arithmetic logical circuit 13 to the output circuit 14 in order to execute direct data transfer from the former to the latter.

Figure 5:
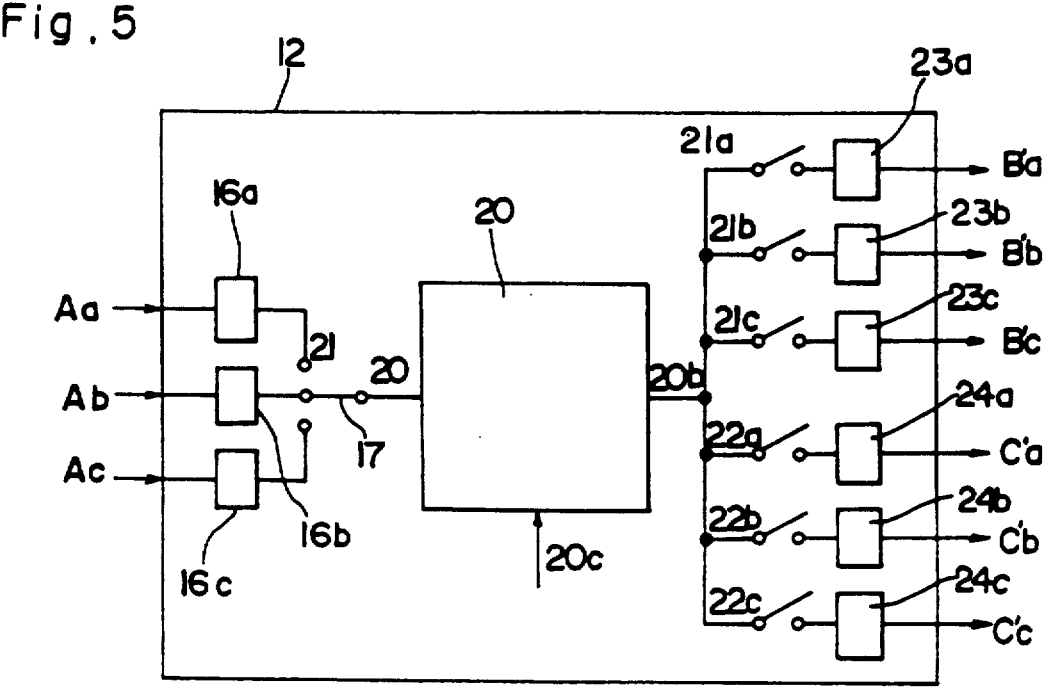
FIG. 5 is a schematic circuit diagram of an image memory.

FIG. 5 shows an example of an internal circuit construction of the image memory 12. For image data input, one of the data on the three data buses A'a, A'b, A'c of the first data channel A' respectively input to three buffers 16a, 16b, 16c is selected by a selecting switch 17 as a data selecting circuit 21 controlled by external control means comprising a microcomputer for example and then input to a data input terminal 20a of a memory 20, which receives address designation signals through its address input terminal 20c from the image memory or from other external sources. For image data output, output image information is derived through an output terminal 20b of the memory 20 and then through switches 21a through 22c acting as switching means for controlling the data flows and further through two of the output ports to be provided on the second and third data channels B, C. All of the switches 21a through 22c are adapted to be switched "ON" and "OFF" independently of each other by being controlled by the external control means, but priority of the data output from this image memory over other data output from the other image memory and from the input circuit is maintained on the same bus. The above-described architecture permits all the planes of the image memory to eqaully connect all of the buses whereby the image memory is provided with a great flexibility for utilization to be described hereinafter. When the image memory has three planes for holding image data including the three RGB elements and the second data channel B' is used for outputting data for forming a colored image and if an operator intends to output the same data with its R element and its B element interchanged with each other, the operator only has to switch between output buffers of the plane for the R element and the one for the B element, i.e. an overall replacement of the image data is not necessary. In another case when the operator wants to monochromically scan contents of the image memory holding image data for a single monochrome image screen, in contrast with a conventional system in which the same image data are written into three memory planes for output, the operator only has to turn "ON" the switches 21a through 21c so that the same data are provided on the three buses B'a, B'b, B'c of the second data channel B.

For coordinating the switches 21a through 22c with the output buffers 23a through 24c in the above case, a three-state buffer IC capable of switching the output state may be actually employed.

Figure 6:
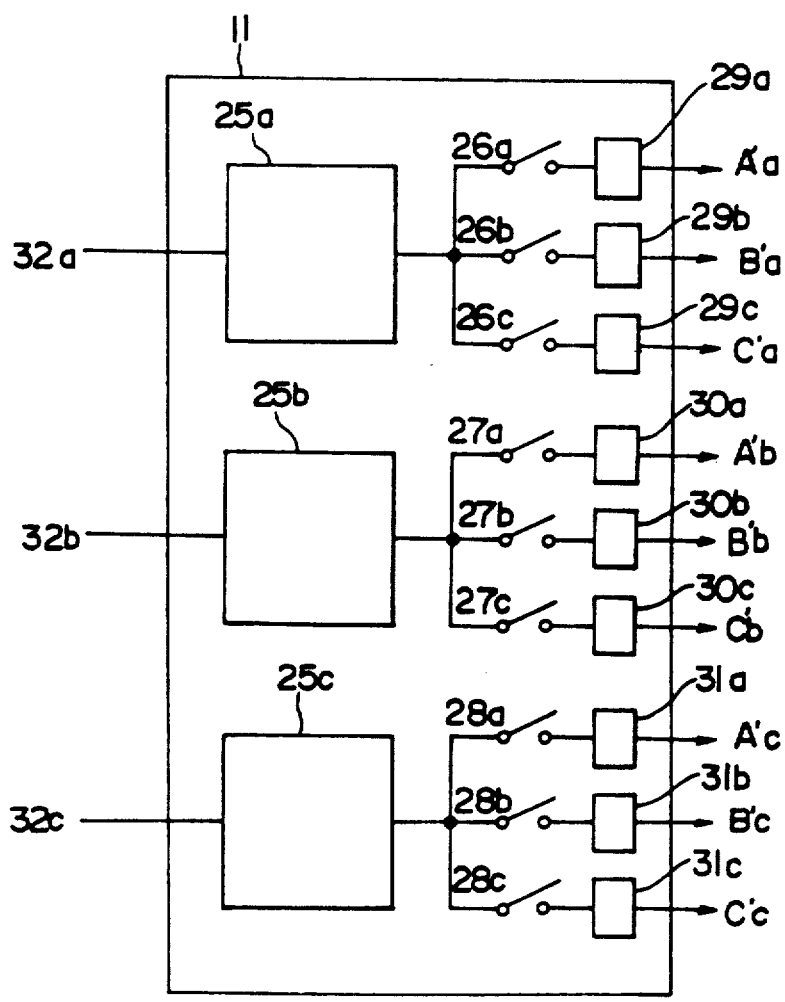
FIG. 6 is a schematic circuit diagram of an image data input circuit.

FIG. 6 illustrates an example of an internal construction of the image data input circuit 11. Colored image information sent from peripherals is separated into the three primary color elements to be input through input terminals 32a, 32b, 32c and then converted in parallel into image data applicable to the system through first through third data conversion circuits 25a, 25b, 25c embedded therein. Data output from the first data conversion circuit 25a are transferred through switches 26a, 26b, 26c controlled by the external control means and then through bus buffers 29a, 29b, further through respective output ports to the data buses A'a, B'a, C'a. In the same manner, data output from the second and third data conversion circuits 25b, 25c are selected by the switches 27a through 27c and 28a through 28c controlled by the external control means and provided on the data buses A'b, B'b, C'b and the data buses A'c, B'c, C'c, respectively. In this case, it is to be noted, the priority of the data output from the second and third data conversion circuits 25b, 25c over data output from the arithmetic logical circuit 13 on the first data channel A' and over data output from the image memory 12 on the second and third data channels B', C' are maintained, respectively. When the RGB elements derived from the colored image from the peripherals are input through the input terminals 32a, 32b, 32c onto the three data buses A'a through A'c of the first data channel A', the switches 26a, 27a, 28a are closed and the data comprising the elements are transferred through the bus buffers and then from the ouput ports onto the first data channel A'. In the same way, for data transfer onto the second data channel B', the switches 26b, 27b, 28b are closed. Thus, the image data input circuit is capable of providing image data on any of the three data channels. Also, by using only one of the input ports, the circuit is capable of monochrome image data input. Further, with a plurality of this image data input circuit, each may be connected to the data channels A', B', C', respectively. For instance, with two of them provided, one for providing color image data on the data channel B' and the other for the data channel C', the arithmetic logical circuit 13 is capable of processing two kinds of color image data from peripherals. The output circuit 14 comprising at least three image data conversion circuits is capable of converting color image data including the three elements and respectively input either from the second data channel B' or from the three exclusive data lines 18a, 18b, 18c into image signals applicable to the peripherals and of providing the signals onto output lines 19a, 19b, 19c.

Moreover, with an increase of its input and output ports, the arithmetic logical cicuit 13 is capable of receiving two kinds of color image data including the three primary color elements RGB, arithmetically and logically processing the respective data for the two kinds and then of outputting the processed result containing the three color elements simultaneously. In this case, needless to say, the arithmetic logical circuit requires three basic arithmetic logical circuits of a kind. Further, the circuit is capable of receiving and processing one kind of color image data and outputting the resulting data. This function is needed for binarizing each of the three primary color data RGB of the color image or for a gradation adjustment through non-linear conversion, where parameters for processing each of the color data may be provided independently. With this function, if data output from the image memory and containing monochrome image data are provided simultaneously on either of the second data channel B' or the third data channel C' and input to the arithmetic logical circuit 13 in the same way as processing the colored image data, the arithmetic logical circuit outputs simulate color data. If the arithmetic logical circuit 13 has three circuits capable of linearly combining three kinds of image data, the circuit may execute color coordinate conversion and then output the resulting data to the first data channel A' or the the output circuit 14.

Furthermore, in addition to the conventional monochrome image data processing, monochrome image data of double precision may be processed by utilizing two of the data buses of the respective three data channels originally designed for color image data processing. Specifically, if each of the channels comprises three eight-bit buses, data of its double precision having sixteen bits of information may be processed. In this case, two of the three basic arithmetic logical circuits each of which has an eight-bit construction are combined and expanded for a sixteen-bit construction, for example. In the same manner, if all of the three buses of the channels are employed, the system may obtain triple precision. Also, if data of three different kinds of monochromatic image data are simultaneously provided on the channels to be arithmetically and logically processed, the overall processing speed is tripled.

Figure 7:
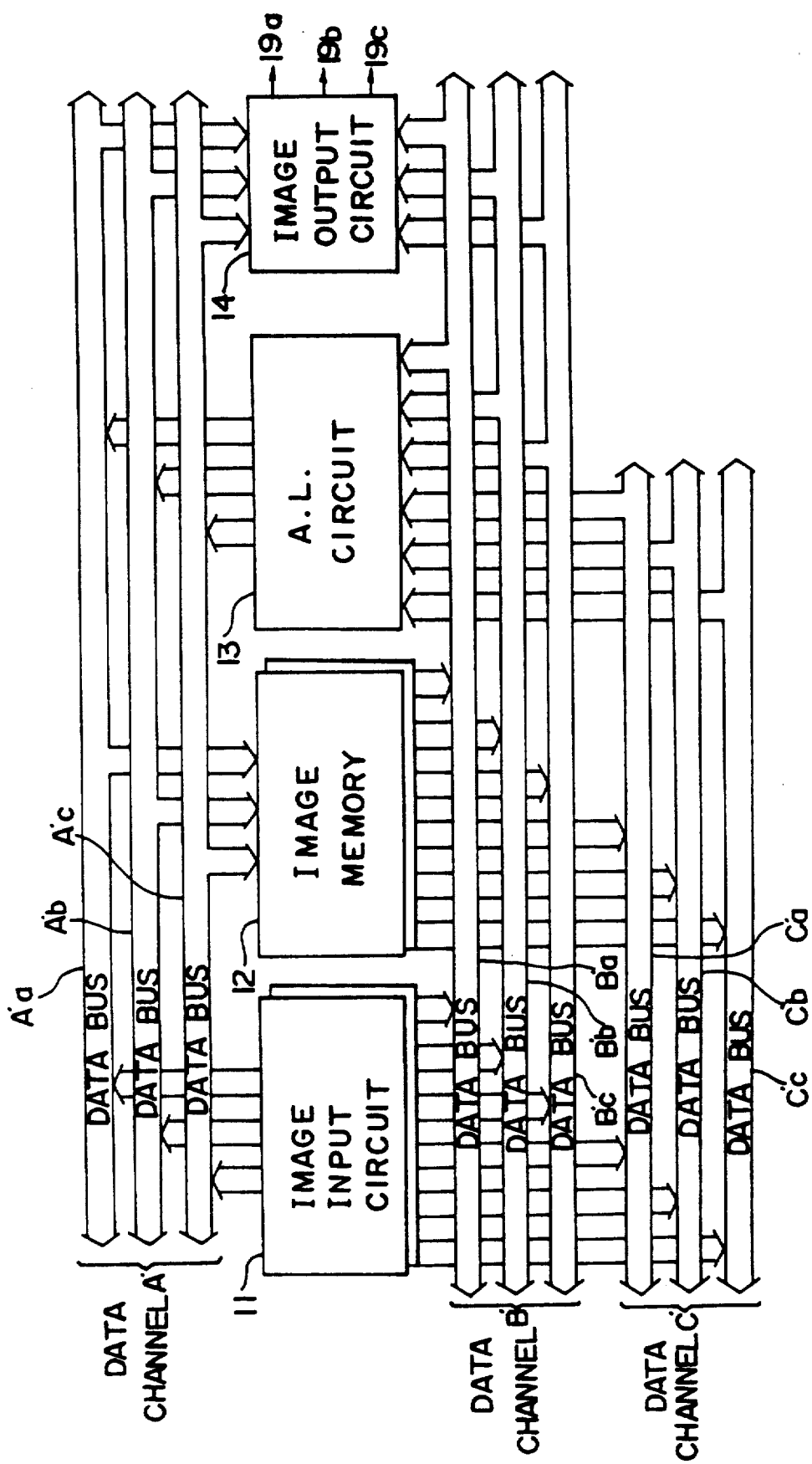
FIG. 7 is a block diagram of a modification of the image data processing system shown in FIG. 4.

FIG. 7 illustrates a modification of the embodiment shown in FIG. 4, which is different from the previous one in that the data lines 18a through 18c designed exclusively for the data transfer from the arithmetic logical circuit 13 to the output circuit 14 are eliminated whereas the data buses Aa through Ac of the first data channel A' are modified to serve in place thereof as connected to newly provided input port(s) of the output circuit 14. The overall functioning of this architecture is the same as that of the previous system shown in FIG. 4.

This architecture, however, has both an advantage over and a disadvantage against the previous one: the former requires only half the number of the output ports of the arithmetic logical circuit 13 but the latter permits, simultaneously with the transfer of the arithmetically and logically processed data to the output circuit, the extra data buses A'a through A'c unused for said operation to serve for writing data into the image memory whereas the former does not.

Figure 8:
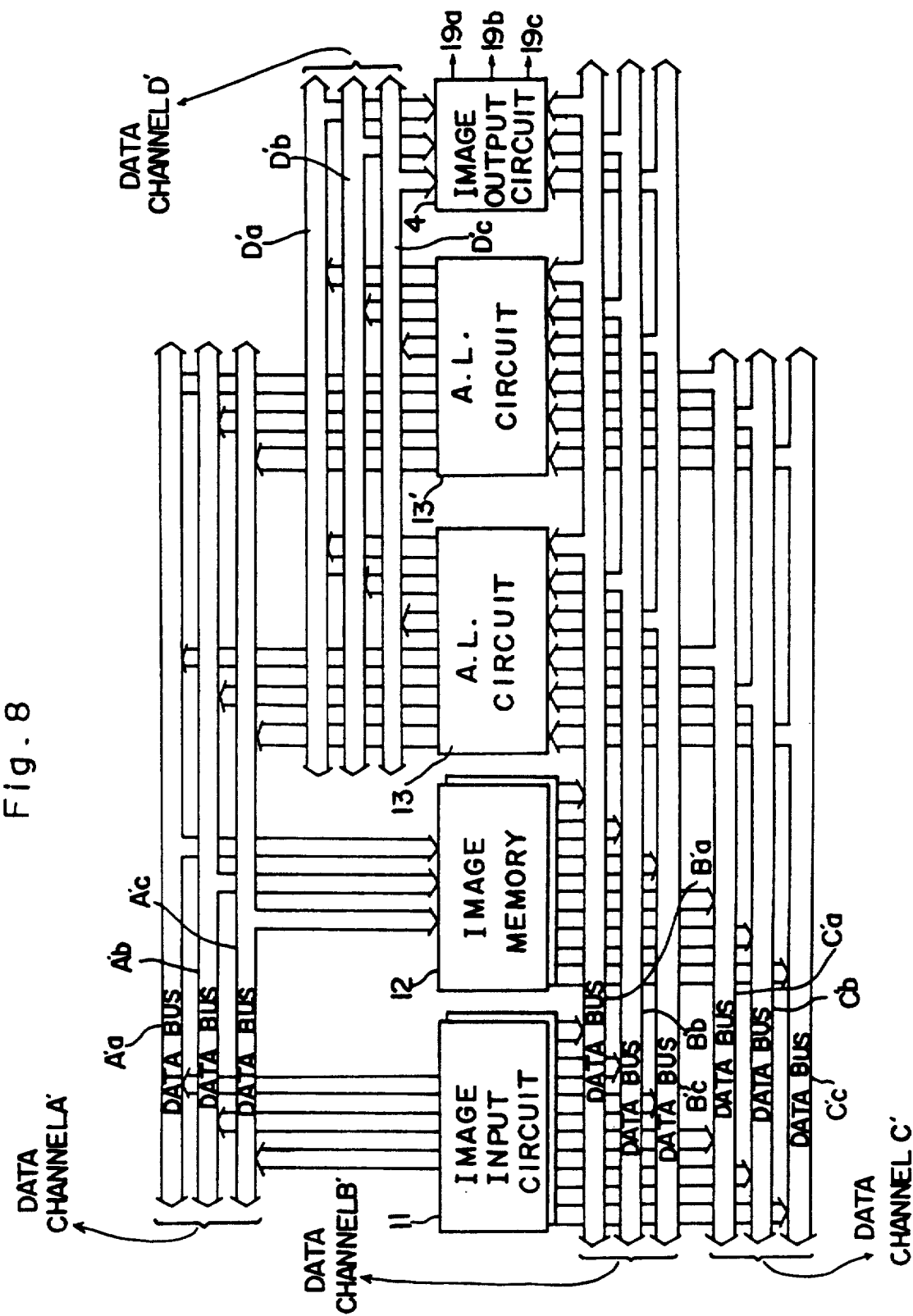
FIG. 8 is a block diagram of another modification of the image data processing system shown in FIG. 4.
Figure 9:
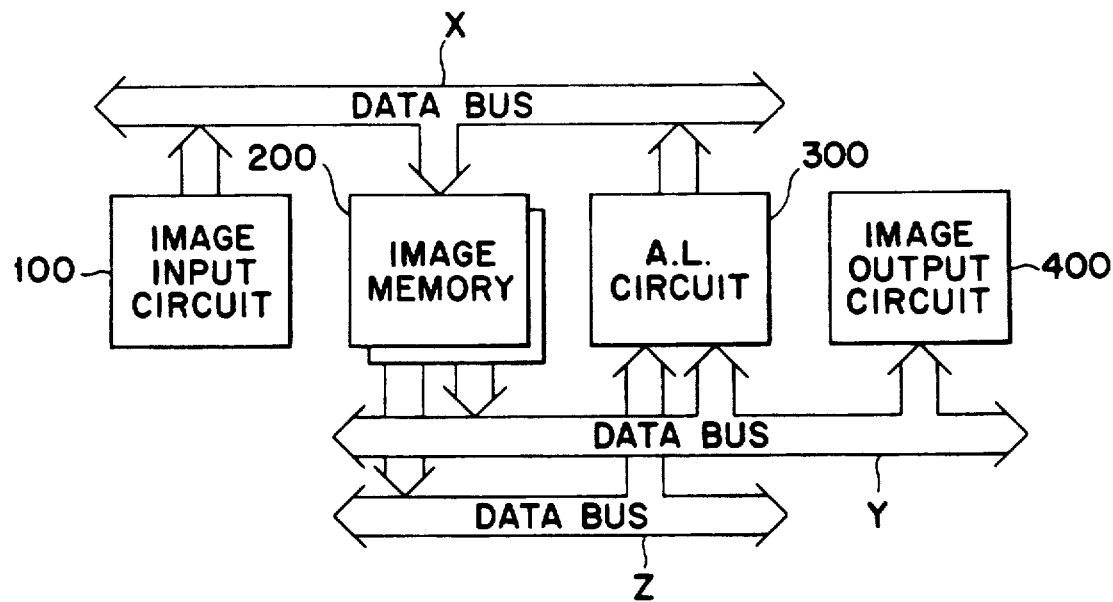
FIG. 9 is a block diagram of a conventional image data processing system.
Figure 10:
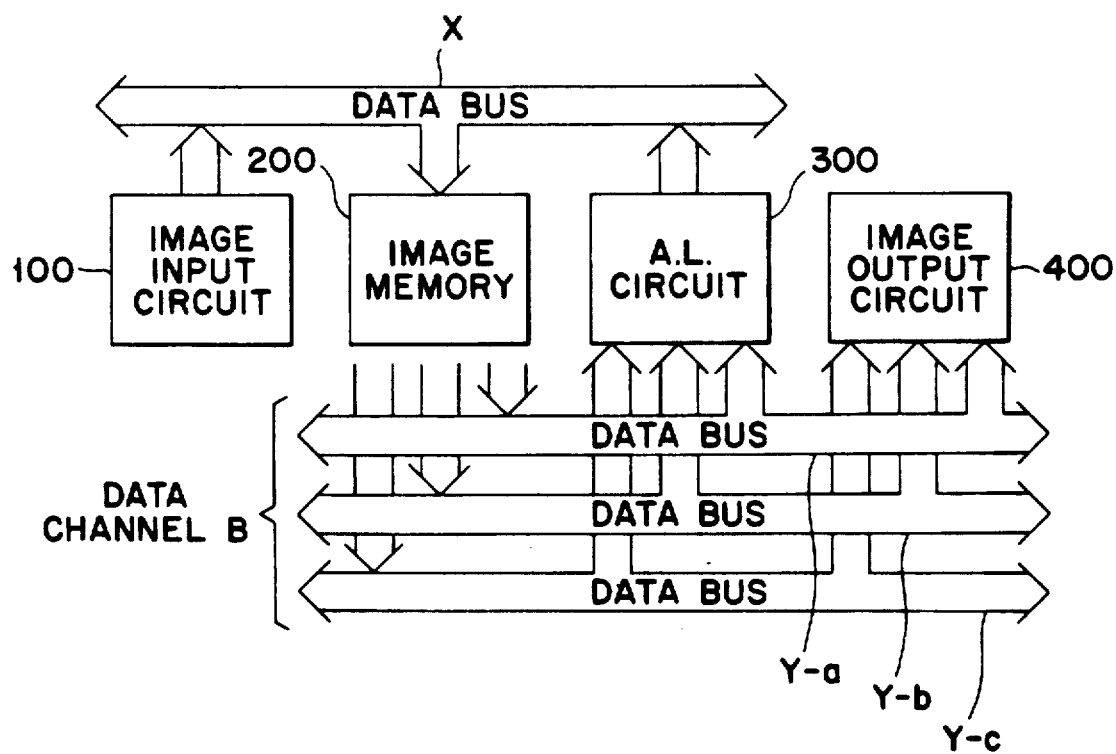
FIG. 10 is a block diagram of another conventional image data processing system.

FIG. 8 shows another modification of the embodiment shown in FIG. 4. The difference is that the modified system comprises a plurality of the arithmetic logical circuits, in this case two circuits 13, 13', and also the three exclusive data lines 18a, 18b, 18c for the data transfer from the arithmetic logical circuit to the output circuit are replaced by an exclusive data channel including three exclusive data buses Da', D'b, D'c. That is to say, this modified image data processing system, in contrast to the image data processing system shown in FIG. 7, is adapted for processing image information having a plurality of (in this case three) elements. Three output ports of each of the arithmetic logical circuits 13, 13' and three input ports of the output circuit 14 are connected through the exclusive data buses D'a, D'b, D'c, whereby the processed data of each of the arithmetic logical circuits 13, 13' are transferred through these exclusive data buses directly to the output circuit 14. The rest of the functions of this system are substantially the same as those of the embodiment shown in FIG. 4. The feature of this system is that a parallel processing is enabled by the two arithmetic logical circuits.

It is to be noted here that in the foregoing embodiments each of the data channels comprises the three data buses (for the R, G, and B elements, respectively), but a data channel comprising more than four data buses, if similarly constructed, may execute a multifunctional and speedy data processing operation. The data channel comprising more than four data channels is required, for instance, for remote sensing image processing by means of an artificial satellite, which is conventionally carried out for image data of more than four bands in the infrared area. This processing may be executed more speedily by processing all data at one time if a requisite number of data buses are provided in the manner disclosed in the present invention. Moreover, with a selection of certain number of buses, processing coordinating particular wave length areas is enabled, thus the system obtains a great number of functions.

As described above, the system according to the present invention is designed, in general, for receiving and arithmetically and logically processing pixel data and including a plurality of elements and for outputting the resulting data. Therefore, the number of kinds of information to be operated on simultaneously and in parallel is not limited to three but may be appropriately varied.

I claim:
1. An image data processing system, comprising:
data bus means including first, second and third data buses for transferring image data therethrough respectively,
an image input circuit for inputting first image data and outputting said first image data on said first data bus;

an image memory for storing second image data different from the first image data and outputting said second image data on said second data bus;

arithmetic logical circuit means for processing image data, said arithmetic logical circuit simultaneously receiving said first image data from said first data bus and said second image data from said second data bus and simultaneously processing said first and second image data and simultaneously outputting processed image data on the third data bus; and an image output circuit commonly provided for inputting the processed image data from the third data bus and outputting the processed image data to peripherals adapted to be connected to said system, whereby said image is output directly through said commonly provided image output circuit, simultaneously with the processing by said arithmetic logical circuit means.

2. An image data processing system as defined in claim 1, further comprising an exclusive fourth data bus for transferring data output from said arithmetic logical circuit means, said arithmetic logical circuit means outputting the data while inputting and processing the first and second image data input through said first and second data buses.

3. An image data processing system as defined in claim 1, wherein said image memory inputs image data of said image input circuit and of said arithmetic logical circuit means from the third data bus, and said image circuit further inputs the image data of said image input circuit through the first data bus.

4. An image data processing system as defined in claim 1, said data bus means further including a fourth data bus on which the first image data and the processed image are transferred to said image memory, and wherein said image output circuit is further connected to directly input the first image data through the first data bus.

5. An image data processing system as defined in claim 1, wherein said image memory comprises
an input section having input ports for inputting the image information respectively from one of said data buses,
a memory section for storing the image information input by said input section,
a selecting circuit for selectively connecting any one of said input ports to said memory section,
an output section having ports which number corresponds to the number of data buses so as to transfer the image information from said memory section to said data buses,
switch means for controlling a flow of the image information from said memory section to each of said output ports, and
control means for controlling said switch means.

6. An image data processing system as defined in claim 5, wherein said output ports of said image memory are connected to said first and second data buses as to be capable of providing the image information to at least one of said data buses.

7. An image data processing system as defined in claim 6, wherein said switch means includes switches provided respectively on each of output lines extended and branched from said memory section in a number corresponding to the number of said output ports.

8. An image data processing system, comprising:
an image input circuit for inputting image data,
an image memory for storing image data,
an arithmetic logical circuit for processing image data, and
a plurality of data buses for connecting between two of or among said image input circuit, said image memory and said arithmetic logical circuit,
said image input circuit, including:
an input section having an input port,
data conversion means connected to said input port,
an output section having a plurality of output ports, the number of output ports being the same as the number of said data buses,
a plurality of switch means for controlling data flow from said data conversion means to each of said output ports, each of said output ports being connected to one of said plurality of switch means, and
control means for controlling said plurality of switch means to selectively control data between said data conversion means and respective ones of said output ports.

9. An image data processing system as defined in claim 8, wherein said switch means includes switches provided respectively on each of a plurality of output lines branched from said data conversion means.

10. An image data processing system as defined in claim 8, wherein said input section includes a plurality of input ports, and said data conversion means includes data conversion circuits connected respectively to each of said input ports.

11. An image data processing system, comprising:
data bus means including a first data bus and a second data bus provided independently from each other for transferring image data therethrough;
an image input circuit for inputting image data and outputting said image data on said first data bus;
an image memory for storing image data and outputting said image data on said first data bus;
arithmetic logical circuit means for processing image data, for inputting image data from said first data bus and excluding data of said image memory, and outputting data on said second data bus;
an image output circuit commonly provided for outputting image data to peripherals adapted to be connected to said system, said image output circuit being connected to input data from said second data bus and from said first data bus, and to output image data from said image input circuit or image data of said arithmetic logical circuit directly through said commonly provided image output circuit to said peripherals, which output image data does not pass through said image memory.

12. An image data processing system as defined in claim 11 wherein said image memory outputs stored image data on said arithmetic logical circuit means and said image output circuit inputs the stored image data from said first data bus.

13. An image data processing system as defined in claim 12, wherein said data bus means further includes a third data bus on which image data of said image input circuit or said arithmetic logical circuit means is output and from which image data output by said image input circuit or said arithmetic logical circuit means is input to said image memory.

14. An image data processing system as defined in claim 13, wherein said second data bus includes said third data bus.

15. An image data processing system as defined in claim 13, wherein said second data bus is an exclusive data bus between said arithmetic logical circuit means and said image output circuit.

16. An image data processing system as defined in claim 11, wherein said image memory comprises
an input section having input ports for inputting the image information respectively from one of said data buses,
a memory section for storing the image information input by said input section,
a selecting circuit for selectively connecting any one of said input ports to said memory section,
an output section having ports which number corresponds to a number of data buses constituting said data bus means so as to transfer the image information from said memory section to said data buses,
switch means for controlling a flow of the image information from said memory section to each of said output ports, and
control means for controlling said switch means.

17. An image data processing system, comprising:
data channel means including first, second and third data channels for transferring image information therethrough respectively, each of said data channels having n-data buses;
an image input circuit for simultaneously inputting n-components of first image information and outputting said image data on said n-data buses of said first and second data channels;
an image memory including at least n-memory planes for storing second image information different from the first image information and outputting image data on said second data channel;
arithmetic logical circuit means for simultaneously processing the n-components of first and second image information, said arithmetic logical circuit simultaneously receiving said first image data from said first data channel and said second image data from said second data channel, simultaneously processing said first and second image data and simultaneously outputting processed image data on the third data channel; and
an image output circuit commonly provided for inputting the processed image data from the third data channel and outputting the processed image data to peripherals adapted to be connected to said system, whereby said image data is output directly through said commonly provided image output circuit, simultaneously with the processing by said arithmetic logical circuit means.

18. An image data processing system as defined in claim 17, wherein said data channel means further includes a third data channel on which said image input circuit and said arithmetic logical circuit means output n-components of image information to be transferred and from which said image memory inputs the n-components of image information.

19. An image data processing system as defined in claim 18, further comprising an image output circuit for simultaneously outputting n-components of image information to peripherals and an exclusive data channel for transferring n-components of image information output from said arithmetic logical circuit means to said image output circuit, and wherein said first data channel is capable of inputting to said image output circuit n-components of image information passing therethrough.

20. An image data processing system as defined in claim 19, wherein said arithmetic logical circuit means includes two arithmetic logical circuits, said two arithmetic logical circuits inputting n-components of image information from said first and second data channels and outputting n-components of image information on said third and exclusive data channels.

21. An image data processing system as defined in claim 18, further comprising an image output circuit for simultaneously outputting n-components of image information to peripherals, and wherein said first and third data channels are capable of inputting to said image output circuit n-components of image information passing therethrough respectively.

22. An image data processing system as defined in claim 17, further comprising an exclusive fourth data channel for transferring image information from said arithmetic logical circuit means, said arithmetic logical circuit means outputting the image information while inputting and processing the first and second image information input through said first and second data channels.

23. An image data processing system as defined in claim 17, wherein said image memory comprises
an input section having input ports for inputting the n-components of image information respectively from one of said data channels,
a memory section for storing the image information input by said input section,
a selecting circuit for selectively connecting any one of said input ports to said memory section,
an output section having ports which number corresponds to the number of data buses constituting said data channel means so as to transfer the image information from said memory section to said data channel means,
switch means for controlling a flow of the image information from said memory section to each of said output ports, and
control means for controlling said switch means.

24. An image data processing system, comprising:
data channel means including first and second data channels provided independently from each other for transferring image information therethrough respectively, each of said data channels having n-data buses;
an image input circuit for simultaneously inputting n-components of image information and outputting said image data on said first data channel;
an image memory including at least n-memory planes for storing second image information and outputting image data on said first data channel;
arithmetic logical circuit means for simultaneously processing n-components of image information, for inputting image data from said first data channel excluding data of said image memory and outputting data on said second data bus; and
a commonly provided image output circuit for inputting the processed image data from the second data channel and simultaneously outputting n-components of image information to peripherals adapted to be connected to said system, whereby said image data is output directly through said commonly provided image output circuit, simultaneously with the processing by said arithmetic logical circuit means.

25. An image data processing system as defined in claim 24, wherein said image memory outputs stored image data on said arithmetic logical circuit means and said image output circuit inputs the stored image data from said first data channel.

26. An image data processing system as defined in claim 25, wherein said data channel means further includes a third data channel on which n-components of image information of said image input circuit or said arithmetic logical circuit means is output and from which n-components of image information output by said image input circuit or said arithmetic logical circuit means is input to said image memory.

27. An image data processing system as defined in claim 26, wherein said second data channel includes said third data channel.

28. An image data processing system as defined in claim 26, wherein said second data channel is an exclusive data channel between said arithmetic logical circuit means and said image output circuit.

29. An image data processing system as defined in claim 24, wherein said image memory comprises
an input section having input ports for inputting the n-components of image information respectively from one of said data channels,
a memory section for storing the image information input by said input section,
a selecting circuit for selectively connecting any one of said input ports to said memory section,
an output section having ports which number corresponds to the number of data buses constituting said data channel means as to transfer the image information from said memory section to said data channel means,
switch means for controlling a flow of the image information from said memory section to each of said output ports, and
control means for controlling said switch means.

* * * * *